US006889273B2

(12) United States Patent
Hayashikoshi et al.

(10) Patent No.: US 6,889,273 B2
(45) Date of Patent: May 3, 2005

(54) COMMUNICATION ADAPTER AND NETWORK SYSTEM USING THE COMMUNICATION ADAPTER

(75) Inventors: Kenji Hayashikoshi, Sagamihara (JP); Satoshi Sakuragi, Yokohama (JP); Hiroshi Inoue, Yamato (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 219 days.

(21) Appl. No.: 10/372,694

(22) Filed: Feb. 24, 2003

(65) Prior Publication Data

US 2003/0163621 A1 Aug. 28, 2003

(30) Foreign Application Priority Data

Feb. 26, 2002 (JP) ........................................ 2002-049909

(51) Int. Cl.[7] ........................ G06F 13/00; G06F 13/12; G06F 15/16
(52) U.S. Cl. ................................ 710/72; 710/2; 710/8; 710/14; 710/36; 710/62; 710/64; 710/104; 710/300; 710/301; 709/217; 709/218; 709/249
(58) Field of Search ............................ 710/2, 8, 11, 12, 710/14–16, 36, 38, 62–64, 65, 72–74, 104–105, 300, 301; 709/200, 213, 217, 218, 219, 238, 249

(56) References Cited

U.S. PATENT DOCUMENTS

| 5,778,024 | A | * | 7/1998 | McDonough | 375/216 |
|---|---|---|---|---|---|
| 6,131,136 | A | * | 10/2000 | Liebenow et al. | 710/316 |
| 6,321,287 | B1 | * | 11/2001 | Rao et al. | 710/260 |
| 6,647,434 | B1 | * | 11/2003 | Kamepalli | 710/14 |
| 6,654,817 | B1 | * | 11/2003 | Huang | 710/1 |
| 6,664,969 | B1 | * | 12/2003 | Emerson et al. | 345/544 |
| 2003/0135681 | A1 | * | 7/2003 | Laity et al. | 710/303 |

* cited by examiner

Primary Examiner—Jeffrey Gaffin
Assistant Examiner—Tanh Q. Nguyen
(74) Attorney, Agent, or Firm—Keating & Bennett, LLP (57) ABSTRACT

A communication adapter includes a cable communication signal processing circuit which enables a PDA to have access to a communication network via a cable and a radio communication signal processing circuit which enables a PDA to have access to a communication network via radio waves. The cable communication signal processing circuit and the radio communication signal processing circuit are provided in a single case or on a single board. The cable communication signal processing circuit and the radio communication signal processing circuit operate simultaneously. By attaching the communication adapter to a PDA, the PDA can have access to the communication network via the cable and to make an access to the communication network via the radio waves. Further, the PDA is capable of communicating with the network via the cable and via the radio waves simultaneously.

31 Claims, 5 Drawing Sheets

COMMUNICATION ADAPTER AND NETWORK SYSTEM USING THE COMMUNICATION ADAPTER

BACKGROUND OF THE INVENTION

1. Field of the Invention

The present invention relates to a communication adapter which connects a PDA personal digital assistant) to a communication network and a network system using the communication adapters.

2. Description of Related Art

Figure 6:
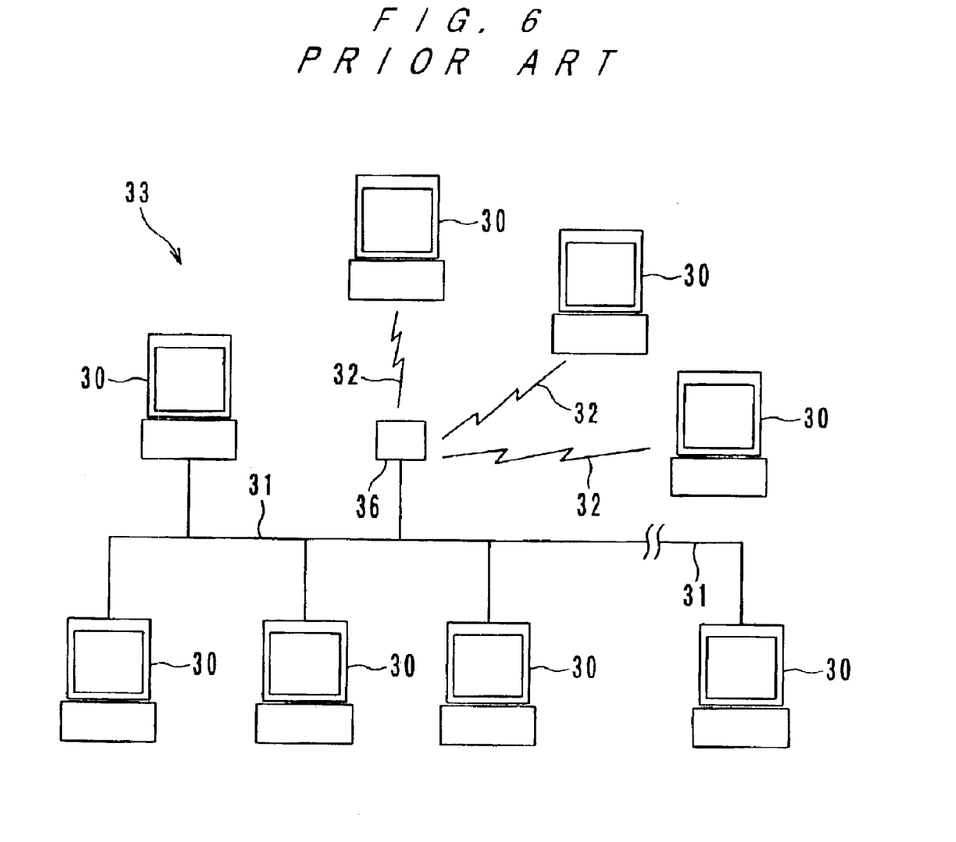
FIG. 6 is a schematic view of a communication network.
Figure 7:
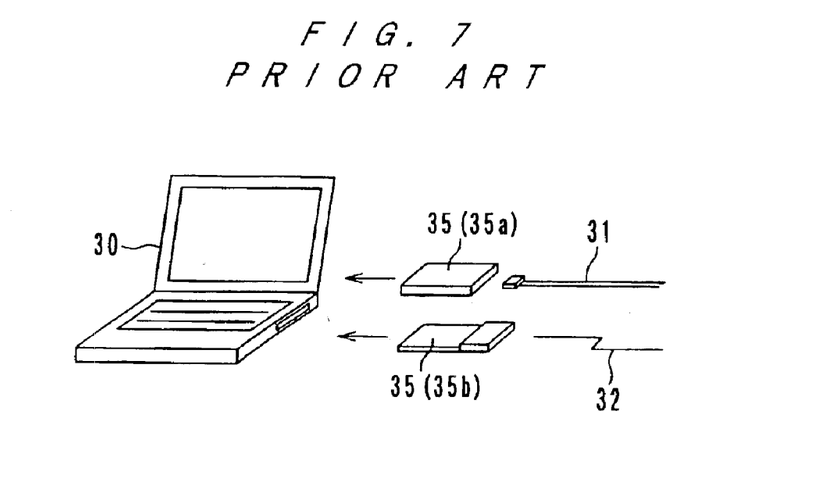
FIG. 7 is a schematic view which shows usage of a conventional communication adapter.

In a communication network system such as a LAN (local area network), as FIG. 6 shows, a plurality of PDAs 30 are capable of communicating with each other via a cable 31 and radio waves 32. As FIG. 7 shows, in order to connect a PDA 30 such as a note-type personal computer to such a communication network system 30, a communication adapter such as a PC card 35 or any other suitable adapter may be used.

There are two types of PC cards 35. One is for cable communication, and the other is for radio communication. When the PDA 30 accesses the communication network 33 via the cable 31, a PC card 35a for cable communication is inserted in the PDA 30. On the other hand, when the PDA 30 accesses the communication network 33 via the radio waves 32, a PC card 35b for radio communication is inserted in the PDA 30.

Thus, every PC card 35 enables a PDA 30 to access a communication network 33 via either a cable or via radio waves, and a PC card 35 which is suited for the access method between the PDA 30 and the communication network 33 must be inserted in the PDA 30.

Therefore, when the PDA 30 is expected to be able to access the communication network 33 via a cable and via radio waves, both the PC card 35a for cable communication and the PC card 35b for radio communication must be provided, which is costly.

Also, when the access method between the PDA 30 and the communication network 33 is switched from cable communication to radio communication or from radio communication to cable communication, the PC card 35a inserted in the PDA 30 must be replaced with the PC card 35b, or the PC card 35b inserted in the PDA 30 must be replaced with the PC card 35a.

In addition, as shown in FIG. 6, in order to enable radio communication of the PDAs 30 through the communication network 33, an access point device 36 is required which makes conversions of signals between a cable communication form and a radio communication-form to relay these signals, which is also costly.

SUMMARY OF THE INVENTION

To overcome the problems described above, preferred embodiments of the present invention provide a communication adapter which is convenient and which enables a PDA to access a communication network at low cost. In addition, preferred embodiments of the present invention provide a network system in which radio communication between PDAs through a communication network is provided without using any access point devices.

The communication adapter according to a preferred embodiment of the present invention includes a cable communication signal processing circuit for enabling the PDA to access the communication network via a cable, and a radio communication signal processing circuit for enabling the PDA to access the communication network via radio waves, and the cable communication signal processing circuit and the radio communication signal processing circuit are independent of each other and are provided in a single case and/or on a single board. Further, the cable communication signal processing circuit and the radio communication signal processing circuit are capable of operating simultaneously.

The communication adapter according to preferred embodiments of the present invention preferably enable the PDA to access a LAN.

The communication adapter preferably includes an interface to the PDA, the interface being one of the following types: a PC card type, a card bus card type, a compact flash™ card type, a PCI type, a mini PCI type, an ISA type and a USB type, or other suitable type.

A network system according to another preferred embodiment of the present invention includes a plurality of PDAs connected to each other via a network. In the network system, a communication adapter according to the preferred embodiment described above is attached to at least one of the plurality of PDAs, and at least one of the PDA(s) to which the communication adapter is attached functions as an access point which makes signal conversions between a cable communication form and a radio communication form. The access point PDA includes a program storing section which is stored with an access point processing program which enables exchanges of signals between a cable communication network and a radio communication network, and a control section which, following the access point processing program, sends a signal which has been input via a cable through the communication adapter from a PDA which is connected to the network by the cable to PDAs which are connected to the network via radio waves through the communication adapter and which sends a signal which has been input by radio waves through the communication adapter from a PDA which is connected to the network by the radio waves to PDAs which are connected to the network via the cable through the communication adapter.

The program storing section is preferably stored with a routing program which determines whether a signal which has been inputted to the access point PDA through the communication adapter is addressed to the PDAs which are connected to the communication network via the cable or to the PDAs which are connected to the communication network via the radio waves based on addressee information included in the signal, which permits sending of the signal to the PDAs which are connected to the communication network via the cable when it is judged that the signal is addressed to the PDAs which are connected via the cable and which permits sending of the signal to the PDAs which are connected to the communication network via the radio waves when it is judged that the signal is addressed to the PDAs which are connected via the radio waves. The control section controls sending of the signal which has been inputted to the access point PDA, following the access point processing program and the routing program.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Preferred embodiments of the present invention are described with reference to the drawings.

Figure 1:
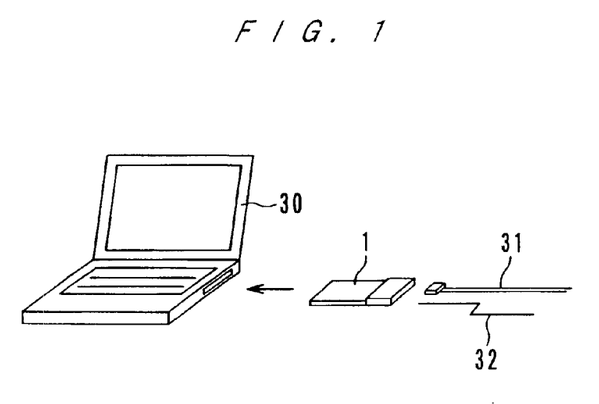
FIG. 1 is a schematic view which shows a communication adapter according to a first preferred embodiment of the present invention.
Figure 2:
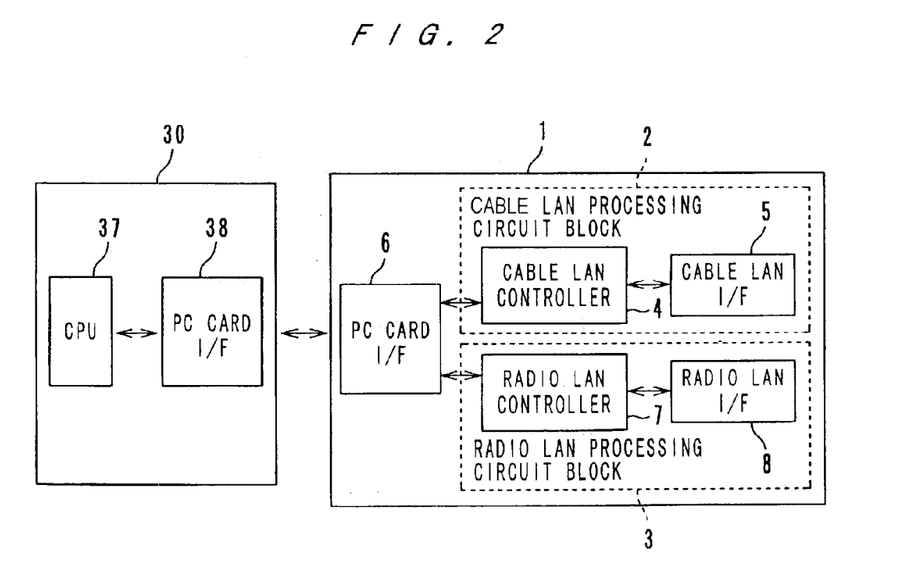
FIG. 2 is a block diagram which shows the control circuit structure of the communication adapter according to the first preferred embodiment of the present invention.

FIG. 1 is a schematic view which shows a communication adapter according to a first preferred embodiment of the present invention. FIG. 2 is a block diagram which shows the principal portion of a control circuit of the communication adapter according to the first preferred embodiment. In the description of the first preferred embodiment, the same components as those in the above-described conventional network system are provided with the same reference numerals, and descriptions of these components are omitted.

In the first preferred embodiment, the communication adapter 1 is preferably a PC card which, when inserted in a PDA 30, such as a note-type personal computer, enables the PDA 30 to access a LAN which is a kind of communication network. This PC card 1 includes a cable LAN processing circuit block 2 which processes cable communication signals and a radio LAN processing circuit block 3 which processes radio communication signals. These blocks 2 and 3 are independent of each other but are provided in a single case.

The cable LAN processing circuit block 2 is a circuit for enabling the PDA 30 to access the LAN via a cable 31 and includes a cable LAN controller 4 and a cable LAN interface (cable LAN I/F) 5. When a cable LAN signal is sent from a CPU 37 of the PDA 30 via a PC card I/F 38 of the PDA 30 and a PC card I/F 6 of the PC card 1, the cable LAN controller 4 receives the signal and converts the signal into a suitable for a cable LAN. Then, the LAN controller 4 outputs the converted signal to the LAN via the cable LAN I/F 5 and the cable 31.

When the LAN controller 4 receives a signal from the LAN via the cable 31 and the cable LAN I/F 5, the cable LAN controller 4 converts the signal into a suitable signal for the PDA 30. Then, the LAN controller 4 outputs the converted signal to the PDA 30 via the PC card I/F 6.

The radio LAN processing circuit block 3 is a circuit for enabling the PDA 30 to access the LAN via radio waves 32 and includes a radio LAN controller 7 and a radio LAN interface (radio LAN I/F) 8. When a radio LAN signal is sent from a CPU 37 of the PDA 30 via the PC card I/F 38 of the PDA 30 and the PC card I/F 6 of the PC card 1, the radio LAN controller 7 receives the signal and converts the signal into a suitable signal for the radio LAN. Then, the LAN controller 7 outputs the converted signal to the LAN via the radio LAN I/F 8 and the radio waves 32.

When an antenna (not shown) installed in the PC card 1 receives a signal from the LAN via the radio waves 32, the signal is input to the radio LAN controller 7 via the radio LAN I/F 8. The radio LAN controller 7 converts the signal into a suitable signal for the PDA 30 and outputs the converted signal to the PDA 30 via the PC card I/F 6.

In the first preferred embodiment, the cable LAN processing circuit block 2 and the radio LAN processing circuit block 3 operate simultaneously. Therefore, merely by inserting this PC card 1 in the PDA 30, the PDA 30 can access the LAN both via the cable 31 and via the radio waves 32, simultaneously. Thereby, for example, the PDA 30 can access an internet via the LAN by the radio waves 32 while accessing a data server connected to the LAN by the cable 31.

The PC card 1 according to the first preferred embodiment of the present invention achieves the following benefits. A conventional PC card 35 functions only as either a cable communication connector or a radio communication connector, and in order to perform both cable communication and radio communication, a PC card 35a for cable communication and a separate PC card 35b for radio communication must be provided. On the other hand, the PC card 1 according to the first preferred embodiment functions both as a cable communication connector and as a radio communication connector, and the PC card 1 is used as a PC card for cable communication and as a PC card for radio communication. Further, the PC card 1 is used as a PC card for both cable communication and radio communication. Therefore, not only when the PDA 30 is to communicate with the LAN 31 only via the cable 31 or only via the radio waves 32, but also when the PDA 30 is to communicate with the LAN 31 via both the cable 31 and the radio waves 32, only the PC card 1 according to the first preferred embodiment of the present invention is required. This is less costly as compared with the case of providing two separate PC cards.

Also, even when the access method to the LAN is switched from cable communication to radio communication or from radio communication to cable communication, it is not necessary to change PC cards.

Further, since the PC card 1 according to the first preferred embodiment of the present invention functions as a both cable communication connector and a radio communication connector simultaneously, merely inserting the PC card 1 in the PDA 30 enables the PDA 30 to communicate with the LAN via the cable 31 and via the radio waves 32, simultaneously. Even if the PDA 30 includes two card slots to accept two types of PC cards, namely, the PC card 35a for cable communication and the PC card 35b for radio communication, only the PC card 1 according to the first preferred embodiment is required to be inserted into the PC card slots of the PDA 30 to carry out cable communication and radio communication between the PDA 30 and the LAN simultaneously. Thus, according to the first preferred embodiment of the present invention, only one PC card is necessary for simultaneous cable and radio communication between a PDA and a LAN, while conventionally, two PC cards of different types is necessary. Further, it is possible to insert a PC card with another function into the other vacant PC card slot of the PDA 30.

In the following, a network system according to a second preferred embodiment of the present invention is described. In the description of the second preferred embodiment, the same components as those in the first preferred embodiment are provided with the same reference numerals, and descriptions of these components are omitted.

Figure 3:
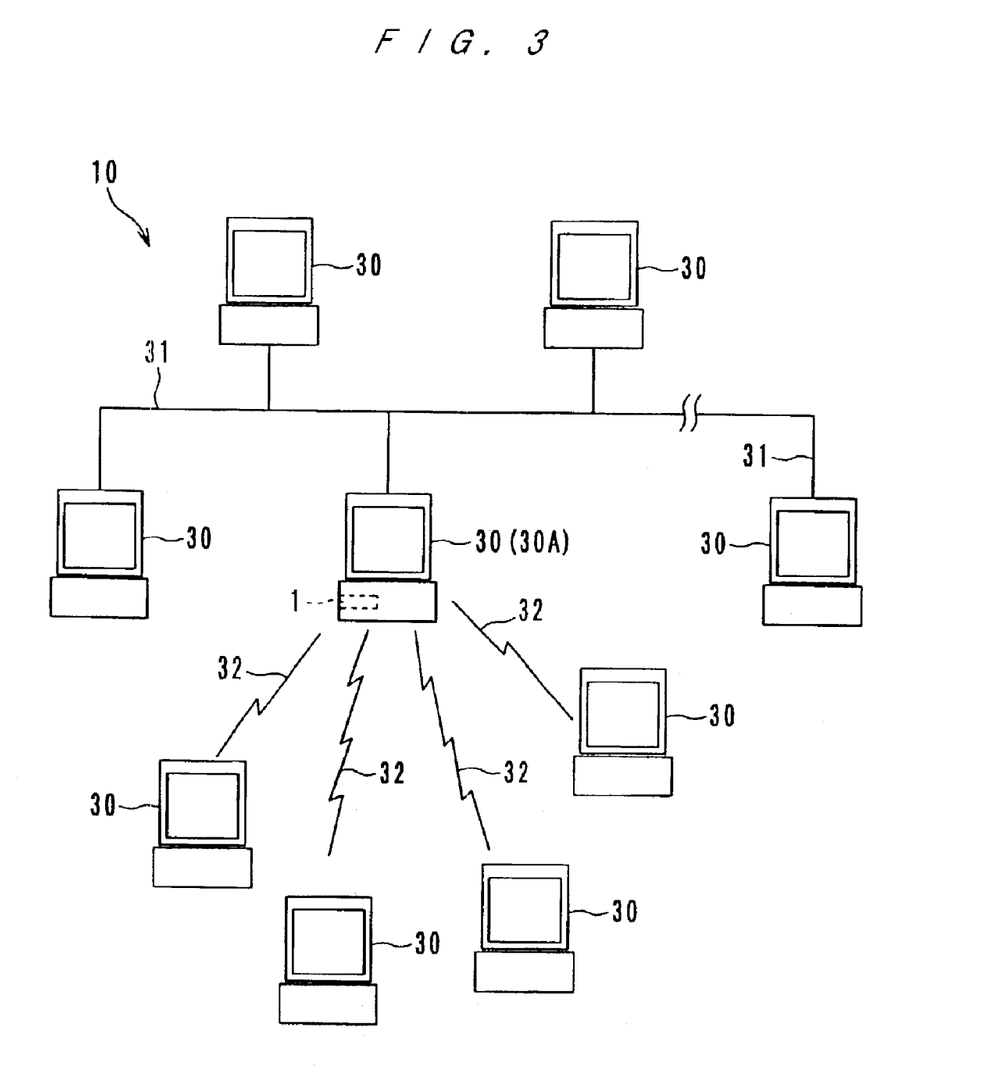
FIG. 3 is a schematic view which shows a network system according to a second preferred embodiment of the present invention.

The network system according to the second preferred embodiment of the present invention includes at least one PDA 30 which functions as an access point. As FIG. 3 shows, a plurality of PDAs 30 are connected to a LAN, and at least one of the PDAs 30 functions as an access point.

Figure 4:
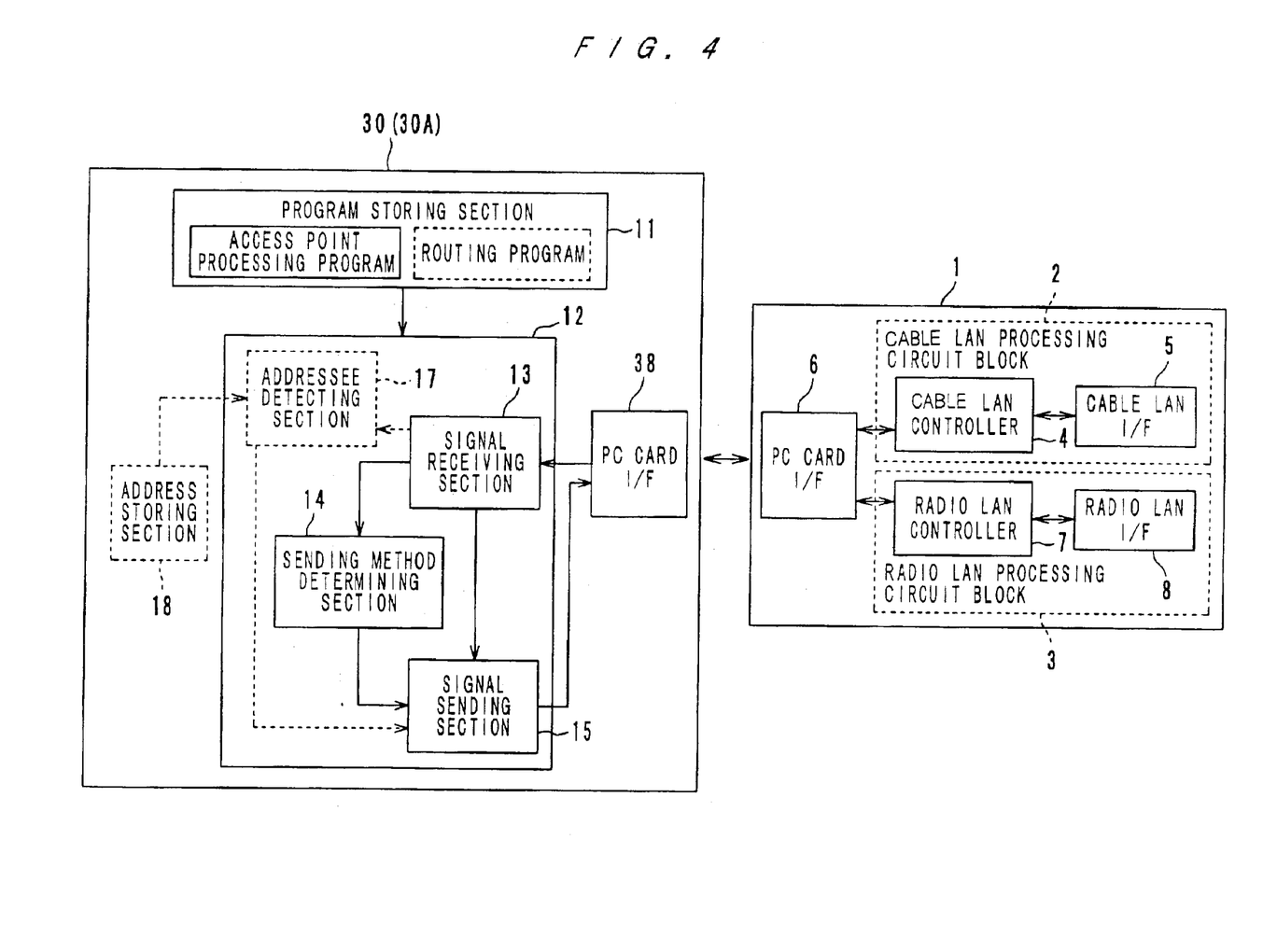
FIG. 4 is a block diagram which shows the control circuit structures which are peculiar to the network systems according to second and third preferred embodiments of the present invention.

In a LAN system 10 according to the second preferred embodiment of the present invention, the PC card 1 according to the first preferred embodiment is inserted in at least one PDA 30 (30A) of the plurality of PDAs 30 connected to the LAN, and the PDA 30A includes a control circuit shown by the solid lines in FIG. 4.

This PDA 30A includes a program storing section 11 and a CPU 12. According to the second preferred embodiment, at least an access point processing program is stored in the program storing section 11. The access point processing program provides a procedure for controlling signal accesses between a cable network and a radio network.

The CPU 12 carries out control according to the access point processing program. For example, as FIG. 4 shows, the CPU 12 includes a signal receiving section 13, a sending method determining section 14 and a signal sending section 15.

The signal receiving section 13 receives a signal input to the PDA 30 through the LAN via the PC card 1 and the PC card I/F 38. Then, the signal receiving section 13 sends the input signal to the sending method determining section 14 and the signal sending section 15. The signal receiving section 13 also sends the sending method determining section 14 a signal which indicates whether the input signal has been sent to the PC card 1 by the cable 31 or by the radio waves 32. There are various ways of determining whether the input signal has been sent by the cable or by the radio waves, for example, the determination may be made in the signal receiving section 13 or may be made in the PC card I/F 38. Here, any suitable method for determining whether the inputted signal has been sent by the cable or by the radio waves, and a description of the determining method is omitted.

The sending method determining section 14, based on the signal sent from the signal receiving section 13, detects whether the signal input to the PDA 30A has been sent by the cable 31 or by the radio waves 32. When the sending method determining section 14 detects that the input signal has been sent by the cable 31, the sending method determining section 14 determines radio communication as the signal sending method. On the other hand, when the sending method determining section 14 detects that the inputted signal has been sent by the radio waves 32, the sending method determining section 14 determines cable communication as the signal sending method. The sending method determining section 14 sends the signal sending section 15 a signal which indicates the result of determination.

The signal sending section 15 receives the signal from the signal receiving section 13 and almost simultaneously receives the sending method signal from the sending method determining section 14. Then, the signal sending section 15 sends the signal by the method commanded by the sending method determining section 14. More specifically, when the sending method signal received from the sending method determining section 14 indicates cable communication, the signal sending section 15 converts the signal received from the signal receiving section 13 into a suitable signal cable LAN access. Then, the signal sending section 15 sends the converted signal to the cable LAN processing circuit block 2 of the PC card 1 via the PC card I/F 38 of the PDA 30A and the PC card I/F 6 of the PC card 1. The cable LAN processing circuit block 2 sends the signal of the cable LAN access form to the PDAs 30 which are connected to the LAN via the cable 31.

When the sending method signal received from the sending method determining section 14 indicates radio communication, the signal sending section 15 converts the signal received from the signal receiving section 13 into a suitable signal for radio LAN access. Then, the signal sending section 15 sends the converted signal to the radio LAN processing circuit block 3 of the PC card 1 via the PC card I/F 38 of the PDA 30A and the PC card I/F 6 of the PC card 1. The radio LAN processing circuit block 3 sends the signal of the radio LAN access form to the PDAs 30 which are connected to the LAN via the radio waves 32.

According to the second preferred embodiment of the present invention, as described above, the PC card 1 is inserted in at least one 30A of the plurality of PDAs 30 which are connected to the LAN, and an access point processing program is installed in the PDA 30A. Therefore, the PDA 30A functions as an access point. Without providing an access point device 36 for exclusive use, the PDAs 30 can be connected to the LAN via the radio waves.

Thus, by providing the PC card 1 according to the first preferred embodiment of the present invention and the access point processing program, which is less costly than preparing an access point device 36 for exclusive use, a LAN including a simple and inexpensive radio communication network is obtained.

Next, a network system according to a third preferred embodiment of the present invention is described. The network system according to the third preferred embodiment includes substantially the same structure as the network system according to the second preferred embodiment. In the network system according to the third preferred embodiment, the PDA 30A which functions as an access point further includes a routing function. In the description of the third preferred embodiment, the same components as those in the second preferred embodiment are provided with the same reference numerals, and descriptions of these components are omitted.

According to the third preferred embodiment, the program storing section 11 of the PDA 30A which functions as an access point is stored with not only an access point processing program but also a routing program shown by the dashed lines in FIG. 4. A signal which has been input to the PDA 30A through the LAN via the PC card 1 includes information regarding the sender of the signal and information about the addresses of the signal. The routing program includes a procedure to control sending of a signal via the cable or via the radio waves based on the addressee information. More specifically, the addressee information is used to determine whether the signal is addressed to the PDAs which are connected to the network via the cable or to the PDAs which are connected to the network via the radio waves, and when it is determined that the addresses are PDAs which are connected to the network via the cable, the signal is sent to the PDAs which are connected via the cable. When it is determined that the addresses are the PDAs which are connected to the network via the radio waves, the signal is sent to the PDAs which are connected via the radio waves.

According to the third preferred embodiment of the present invention, the CPU 12 sends a signal following the access point processing program and the routing program. The CPU 12 includes an addressee detecting section 17 shown by the dashed line in FIG. 4 as well as the components of the CPU 12 of the PDA 30A of the network system according to the second preferred embodiment.

The signal input to the PDA 30A via the PC card 1 is received by the signal receiving section 13 and then received by the addressee detecting section 17. The addressee detecting section 17 reads the addressee information from the signal and references the address information stored in an address storing section 18. The address information includes the addresses of the PDAs which are connected to the LAN and has been stored in the address storing section 18 by an address information producing section (not shown). There are various methods of producing address information and storing the address information. Here, any suitable method can be used, and a description thereof is omitted.

The addressee detecting section 17 recognizes the addresses of the PDAs which the signal is addressed to by referring to the address information stored in the address storing section 18 and sends the addresses of the PDAs to the signal sending section 15. The signal sending section 15 receives the input signal from the signal receiving section 13 and almost simultaneously receives the sending method signal from the sending method determining section 14 and the addresses of the PDAs from the addressee detecting section 17. When the access method to the addressees is identical to the sending method determined by the sending method determining section 14, the signal sending section 15 converts the signal received from the signal receiving section 13 into a suitable signal for the determined sending method and sends the converted signal to the cable LAN processing circuit block 2 or the radio LAN processing circuit block 3 of the PC card 1 according to the determined sending method.

According to the third preferred embodiment of the present invention, the PDA 30A which functions as an access point also includes a routing function. Therefore, when the signal which has been input to the PDA 30A through the LAN via the cable is addressed to the PDAs 30 which are connected to the LAN via the cable, the signal is not sent to the PDAs 30 which are connected to the LAN via the radio waves. On the other hand, when the signal which has been input to the PDA 30A through the LAN via the radio waves is addressed to the PDAs 30 which are connected to the LAN via the radio waves, the signal is not sent to the PDAs 30 which are connected to the LAN via the cable. Consequently, the throughput is greatly improved.

For example, while a PDA 30 which is connected to the LAN via the radio waves is performing data transmission through the LAN, when the access point PDA 30A sends a signal to the PDAs 30 which are connected to the LAN via the radio waves, the signal output from the access point PDA 30A is inserted between frames of data transmitted by the PDA 30 via the radio waves. If the signal sent from the access point PDA 30A is not addressed to the PDAs 30 which are connected via the radio waves, the data for these signal are unnecessary for the PDA 30 which is carrying out data transmission via the radio waves. However, due to the reception of the unnecessary data, the speed of the data transmission carried out by the PDA 30 is greatly reduced, that is, the throughput is greatly reduced.

According to the third preferred embodiment of the present invention, however, the access point PDA 30A does not send the radio LAN any signals addressed to the PDAs 30 which are connected to the cable LAN, and thus, the throughput is greatly improved.

Next, a fourth preferred embodiment of the present invention is described. In the description of the fourth preferred embodiment, the same components as those of the first, second and third preferred embodiments are provided with the same reference numerals, and description of these components are omitted.

According to the first through third preferred embodiments, the communication adapters include PC card type interfaces to PDAs 30. A communication adapter 1 according to the fourth preferred embodiment, however, includes an interface of another type. In the adapter 1 according to the fourth preferred embodiment, all the components other than the interface are the same as those of the first through third preferred embodiments. In the adapter 1 according to the fourth preferred embodiment, the cable LAN processing circuit block 2 and the radio LAN processing circuit block 3 are independent of each other and are provided in a single case. The cable LAN processing circuit block 2 and the radio LAN processing circuit block 3 operate simultaneously.

Figure 5:
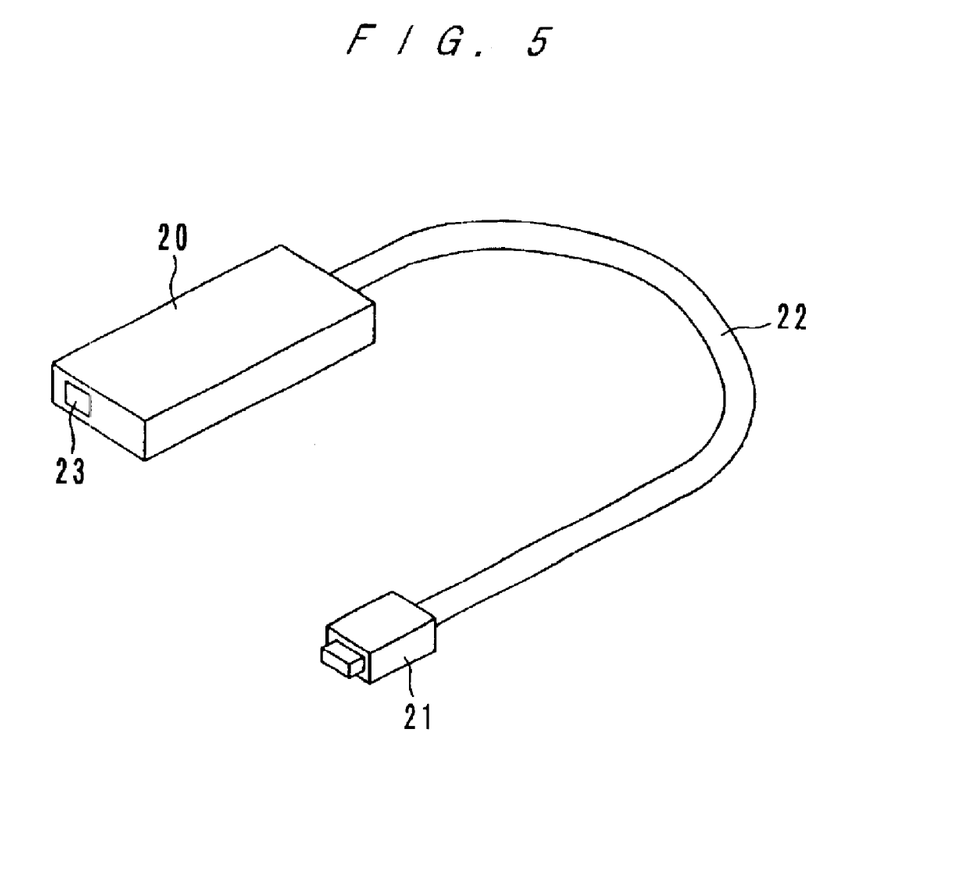
FIG. 5 is a schematic view of a communication adapter of a USB type.

For the communication adapter 1, various types of interfaces can be used. For example, a card type such as a card bus card and a compact flash™ card, a board type such as a PCI, a mini PCI and an ISA, a USB type shown by FIG. 5 and other types can be used. In FIG. 5, numeral 20 denotes a case which includes the cable LAN processing circuit block 2, the radio LAN processing circuit block 3 and other circuits. The numeral 21 denotes a USB interface connector for connecting this adapter 1 to a PDA 30. The numeral 22 denotes a cable which connects the circuits in the case 20 to the USB interface connector 21. The numeral 23 denotes a cable connector for connecting the cable LAN processing circuit block 2 to a cable 31.

According to the fourth preferred embodiment, the communication adapter 1 may be of a card type, a USB type, IEEE1394 type or any other suitable type, and thereby, the communication adapter 1 can be attached to and detached from a PDA 30 easily. Therefore, the communication adapter 1 according to the fourth preferred embodiment is flexible with the environment of the PDA 30.

When the communication adapter 1 is of a board type, the adapter 1 can be installed inside a PDA 30, and the design of the PDA 30 will be improved.

A communication adapter and a network system according to the present invention are not limited to the structure which has been described in connection with the first through fourth preferred embodiments. According to the first through fourth preferred embodiments, the communication adapter 1 is preferably configured to enable a PDA 30 to have access to a LAN. However, the communication adapter 1 may have a cable communication signal processing circuit instead of the cable LAN processing circuit block 2, such that the PDA 30 can have access to a communication network besides a LAN via a cable.

Also, the communication adapter 1 may have a radio communication signal processing circuit instead of the radio LAN processing circuit block 3, such that the PDA 30 can have access to a communication network besides a LAN via radio waves.

In the descriptions of the first through fourth preferred embodiments, a personal computer has been described as an example of a PDA 30 connected to a communication network. However, the PDA 30 connected to a communication network may be a mobile telephone.

FIG. 3 shows the communication adapter 1 provided in only one of the PDAs 30 which are connected to a communication network. The communication adapters 1 according to the first through fourth preferred embodiments may be provided in two or more of the PDAs 30.

Although the present invention has been described in connection with the preferred embodiments described above, it is to be noted that various changes and modifications are possible to those who are skilled in the art. Such changes and modifications are to be understood as being within the scope of the present invention.

A communication adapter according to a preferred embodiment of the present invention preferably includes a cable communication signal processing circuit and a radio communication signal processing circuit which are independent of each other, and accordingly, the communication adapter functions both as a cable communication connector and as a radio communication connector. Therefore, merely by inserting the communication adapter according to a preferred embodiment of the present invention in a PDA, the PDA has access to a communication network via a cable and via radio waves.

Thus, not only when a PDA is expected to have access to a communication network either via a cable or radio waves but also when the PDA is expected to have access to a communication network and a case of making an access to a communication network by radio waves, only one communication adapter according to a preferred embodiment of the present invention is required. Accordingly, the cost is greatly reduced as compared with a conventional case which requires two communication adapters of different types, namely, an adapter for cable communication and an adapter for radio communication.

As already mentioned, the communication adapter according to a preferred embodiment of the present invention functions as both a cable communication connector and as a radio communication connector, and therefore, in switching the access method to a communication network from cable communication to radio communication or from radio communication to cable communication, it is not necessary to change communication adapters. Thus, the access method can be quickly and easily switched.

Further, the communication adapter according to a preferred embodiment of the present invention is configured such that the cable communication signal processing circuit and the radio communication signal processing circuit operate simultaneously. Therefore, by merely inserting the communication adapter in a PDA, the PDA has access to a communication network via a cable while making an access to a communication network via radio waves.

For example, when a PDA which includes a plurality of external connection areas so as to accept a plurality of adapters is required to have access to a communication network via a cable and via radio waves simultaneously, conventionally, two communication adapters must be provided in two of the external connection areas of the PDA. According to the present invention, however, only one communication adapter is required in one of the plurality of external connection areas, and the other vacant external connection area(s) can be used for any other purpose(s).

When the communication adapter includes an interface of a PC card type, a card bus card type, a compact flash™ card type or USB type, the communication adapter can be attached to and detached from a PDA easily, and flexible usage of the communication adapter in accordance with the environment of the PDA is obtained. When the communication adapter has an interface of a PCI type, a mini PCI type or an ISA type, the communication adapter can be installed inside a PDA, and the design freedom of the PDA is greatly improved.

Further, by inserting a communication adapter in a PDA which is connected to a communication network and by installing an access point processing program in the PDA, this PDA functions as an access point in the network. Thus, when at least one of the PDAs which are connected to a communication network also functions as an access point, the PDAs have access to the network via radio waves without having any access point devices for exclusive use provided in the network. In other words, by merely providing a small inexpensive communication adapter according to a preferred embodiment of the present invention and an access point processing program, without providing an access point device for exclusive use, a communication network including a radio communication network is obtained.

Moreover, by installing a routing program in the access point PDA, the access point PDA performs routing. More specifically, when the access point PDA receives a signal, from addressee information included in the signal, the access point PDA determines whether the signal is addressed to the PDAs which are connected to the network via a cable or to the PDAs which are connected to the network via radio waves. Then, when the signal is addressed to the PDAs which are connected via the cable, the access point PDA sends signals to these PDAs in the cable communication network, and when the signal is addressed to the PDAs which are connected via the radio waves, the access point PDA sends signal to these PDAs in the radio communication network.

Therefore, when the signal which has been input to the access point PDA via the cable is addressed to the PDAs which are connected to the network via the cable, the signal is not sent to the PDAs which are connected to the network via the radio waves. On the other hand, when the signal which has been input to the access point PDA via the radio waves is addressed to the PDAs which are connected to the network via the radio waves, the signal is not sent to the PDAs which are connected to the network via the cable.

With this arrangement, the signals flowing in the cable communication network include a reduced number of signals addressed to the PDAs which are connected via the radio waves, and the signals flowing in the radio communication network include a reduced number of signals addressed to the PDAs which are connected via the cable. Accordingly, the speed of data transmission between PDAs is greatly increased. In other words, the throughput is greatly improved.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A communication adapter for use with a personal digital assistant to enable the personal digital assistant to have access to a communication network, said communication adapter comprising:

a cable communication signal processing circuit for permitting the personal digital assistant to have access to the communication network via a cable; and a radio communication signal processing circuit for permitting the personal digital assistant to have access to the communication network via radio waves; wherein the cable communication signal processing circuit and the radio communication signal processing circuit are independent of each other and are provided in a single case or on a single board; and the cable communication signal processing circuit and the radio communication signal processing circuit operate simultaneously.

2. A communication adapter according to claim 1, wherein the communication network is a local area network.

3. A communication adapter according to claim 1, further comprising an interface to the personal digital assistant.

4. A communication adapter according to claim 3, wherein the interface to the personal digital assistant is one of a PC card interface, a card bus card interface, a compact flash card interface, a PCI interface, a mini PCI interface, an ISA interface and a USB interface.

5. A communication adapter according to claim 1, wherein the communication adapter is a PC card that is insertable into the personal digital assistant.

6. A communication adapter according to claim 1, wherein the cable communication signal processing circuit includes a cable local area network controller and a cable local area network interface.

7. A communication adapter according to claim 6, wherein the cable local area network controller receives a signal from the personal digital assistant and converts the signal into a signal suitable for the cable for use with the communication network.

8. A communication adapter according to claim 6, wherein the cable local area network controller receives a signal from the cable and converts the signal into a signal suitable for the personal digital assistant.

9. A communication adapter according to claim 1, wherein the radio communication signal processing circuit includes a radio local area network controller and a radio local area network interface.

10. A communication adapter according to claim 9, wherein the radio local area network controller receives a signal from the personal digital assistant and converts the signal into a signal suitable for the cable for use with the communication network.

11. A communication adapter according to claim 9, wherein the radio local area network controller receives a signal from the cable and converts the signal into a signal suitable for the personal digital assistant.

12. A communication adapter according to claim 1, wherein the personal digital assistant is a computer.

13. A communication adapter according to claim 1, wherein the personal digital assistant is a mobile telephone.

14. A network system comprising:
a network;
a plurality of personal digital assistants connected to each other via the network;
a communication adapter attached to at least one of the plurality of personal digital assistants and including:
a cable communication signal processing circuit for permitting the personal digital assistants to have access to the network via a cable; and
a radio communication signal processing circuit for permitting the personal digital assistants to have access to the network via radio waves, wherein the cable communication signal processing circuit and the radio communication signal processing circuit are independent of each other and are provided in a single case or on a single board, and the cable communication signal processing circuit and the radio communication signal processing circuit operate simultaneously; wherein
at least one of the plurality of personal digital assistants to which the communication adapter is attached functions as an access point which makes signal conversions between a cable communication form and a radio communication form, the access point personal digital assistant including:
a program storing section including an access point processing program which exchanges signals between a cable communication network and a radio communication network; and
a control section which, following the access point processing program, sends a signal which has been input by the cable through the communication adapter from a personal digital assistant which is connected to the network by the cable to the personal digital assistants which are connected to the network via radio waves through the communication adapter and which sends a signal which has been input by radio waves through the communication adapter from a personal digital assistant which is connected to the network by the radio waves to the personal digital assistants which are connected to the network via the cable through the communication adapter.

15. A network system according to claim 14, wherein the program storing section further includes a routing program which determines whether a signal which has been input to the access point personal digital assistant through the communication adapter is addressed to the personal digital assistants which are connected to the communication network via the cable or to the personal digital assistants which are connected to the communication network via the radio waves based on addressee information included in the signal, which permits sending of the signal to the personal digital assistants which are connected to the communication network via the cable when it is determined that the signal is addressed to the personal digital assistants which are connected via the cable and which permits sending of the signal to the personal digital assistants which are connected to the communication network via the radio waves when it is determined that the signal is addressed to the personal digital assistants which are connected via the radio waves; and
the control section controls sending of the signal which has been input to the access point personal digital assistant, following the access point processing program and the routing program.

16. A network system according to claim 14, wherein the control section includes a signal receiving section, a sending method determining section and a signal sending section.

17. A network system according to claim 16, wherein the signal receiving section receives an input signal from one of the personal digital assistants connected to the network and sends the sending method determining section a signal to indicate whether the input signal was sent to the communication adapter via the cable or via radio waves.

18. A network system according to claim 17, wherein the sending method determining section determines a method of communication based on the signal received from the receiving section which indicates whether the input signal was sent to the communication adapter via the cable or via radio waves and sends a signal to the signal sending section.

19. A network system according to claim 18, wherein the signal sending section receives the input signal from the signal receiving section and the signal from the sending method determining section and converts the input signal on the basis of the signal received from the sending method determining section and outputs a converted signal.

20. A network system according to claim 14, wherein the network is a local area network.

21. A network system according to claim 14, further comprising an interface to at least one of the personal digital assistants.

22. A network system according to claim 21, wherein the interface to the at least one of the personal digital assistants is one of a PC card interface, a card bus card interface, a compact flash card interface, a PCI interface, a mini PCI interface, an ISA interface and a USB interface.

23. A network system according to claim 14, wherein the communication adapter is a PC card that is insertable into one of the personal digital assistants.

24. A network system according to claim 14, wherein the cable communication signal processing circuit includes a cable local area network controller and a cable local area network interface.

25. A network system according to claim 24, wherein the cable local area network controller receives a signal from one of the personal digital assistants and converts the signal into a signal suitable for the cable for use with the network.

26. A network system according to claim 24, wherein the cable local area network controller receives a signal from the cable and converts the signal into a signal suitable for the personal digital assistants.

27. A network system according to claim 14, wherein the radio communication signal processing circuit includes a radio local area network controller and a radio local area network interface.

28. A network system according to claim 27, wherein the radio local area network controller receives a signal from one of the personal digital assistants and converts the signal into a signal suitable for the cable for use the network.

29. A network system according to claim 27, wherein the radio local area network controller receives a signal from the cable and converts the signal into a signal suitable for the personal digital assistants.

30. A network system according to claim 14, wherein at least one of the personal digital assistants is a computer.

31. A network system according to claim 14, wherein at least one of the personal digital assistants is a mobile telephone.

* * * * *